(12) United States Patent
Jones (10) Patent No.: US 9,086,546 B2
(45) Date of Patent: Jul. 21, 2015

(54) CONNECTOR SYSTEMS HAVING RECEPTACLE ASSEMBLY AND PLUG ASSEMBLY

(71) Applicant: Ashley Wesley Jones, Denton, TX (US)

(72) Inventor: Ashley Wesley Jones, Denton, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/790,599

(22) Filed: Mar. 8, 2013

(65) Prior Publication Data

US 2014/0147081 A1    May 29, 2014

Related U.S. Application Data

(60) Provisional application No. 61/731,222, filed on Nov. 29, 2012.

(51) Int. Cl.
*G02B 6/38* (2006.01)

(52) U.S. Cl.
CPC ............ *G02B 6/3825* (2013.01); *G02B 6/3821* (2013.01); *G02B 6/3831* (2013.01); *G02B 6/3885* (2013.01); *G02B 6/3893* (2013.01); *G02B 6/3897* (2013.01)

(58) Field of Classification Search
CPC ............................. G02B 6/3825; G02B 6/3897
See application file for complete search history.

(56) References Cited

U.S. PATENT DOCUMENTS

| | | | | |
|---|---|---|---|---|
| 5,647,043 A | * | 7/1997 | Anderson et al. ............... | 385/78 |
| 6,095,695 A | | 8/2000 | Ohtsuka et al. ................. | 385/72 |
| 6,422,760 B1 | * | 7/2002 | Matasek et al. ................. | 385/60 |
| 7,785,018 B2 | * | 8/2010 | Jones et al. ...................... | 385/73 |
| 2005/0281509 A1 | * | 12/2005 | Cox et al. ......................... | 385/59 |
| 2006/0063436 A1 | | 3/2006 | Gurreri et al. ................ | 439/680 |
| 2010/0266245 A1 | | 10/2010 | Sabo .............................. | 385/79 |

FOREIGN PATENT DOCUMENTS

| | | | | |
|---|---|---|---|---|
| EP | 0485196 A2 | 5/1992 | ............... | G02B 6/38 |
| JP | 2007-121929 | 5/2007 | ............... | G02B 6/38 |
| JP | 4818666 B2 | 9/2011 | ............... | G02B 6/38 |
| WO | WO 2006/076061 A2 | 7/2006 | ............... | G02B 6/36 |

OTHER PUBLICATIONS

Patent Cooperation Treaty, International Search Report and Written Opinion for International Application No. PCT/US2013/070492; Mailing Date Feb. 19, 2014—10 pages.

* cited by examiner

*Primary Examiner* — Omar R Rojas (57) ABSTRACT

A data center connector (DCC) system includes a receptacle connector assembly that includes a receptacle body having a plug receiving end, a panel assertion end and a plug receiving chamber at the plug receiving end that receives a plug body of a plug connector assembly. A receptacle ferrule is located in the receptacle body. The receptacle ferrule is moveable axially within the receptacle body and biased toward the plug receiving end. A plug connector assembly includes a plug body having an insertion end sized to be received within the plug receiving chamber of the receptacle body. A plug ferrule is fixed axially within the plug body that contacts the receptacle ferrule and moves the receptacle ferrule axially with the plug body being inserted within the plug receiving chamber of the receptacle body.

18 Claims, 11 Drawing Sheets

CONNECTOR SYSTEMS HAVING RECEPTACLE ASSEMBLY AND PLUG ASSEMBLY

PRIORITY

This application claims the benefit of priority under 35 U.S.C. §119 of U.S. Provisional Application Ser. No. 61/731,222 filed on Nov. 29, 2012 the content of which is relied upon and incorporated herein by reference.

FIELD

The disclosure relates to fiber optic connectors and, more particularly to data center connector systems including a receptacle assembly and a plug assembly.

BACKGROUND

Connectors are often used in cable management systems to provide service connections to rack-mounted equipment and to provide inter-rack connections. Typical connectors for mating fiber optics include two connectors that are joined by an adapter. As one example of a connector, an MPO-style connector is a multi-fiber connector suitable for high-density backplane and printed circuit board (PCB) applications for data and telecom systems. MPO-style connectors generally utilize adapters, which align the MPO-style connectors with other multi-fiber connectors for forming a connection therebetween.

SUMMARY

In one embodiment, a data center connector (DCC) system includes a receptacle connector assembly that includes a receptacle body having a plug receiving end, a panel assertion end and a plug receiving chamber at the plug receiving end that receives a plug body of a plug connector assembly. A receptacle ferrule is located in the receptacle body. The receptacle ferrule is moveable axially within the receptacle body and biased toward the plug receiving end. A plug connector assembly includes a plug body having an insertion end sized to be received within the plug receiving chamber of the receptacle body. A plug ferrule is fixed axially within the plug body that contacts the receptacle ferrule and moves the receptacle ferrule axially with the plug body being inserted within the plug receiving chamber of the receptacle body.

In another embodiment, a receptacle connector assembly for use in a data center connector system includes a receptacle body having a plug receiving end, a panel assertion end and a plug receiving chamber at the plug receiving end that receives a plug body of a plug connector assembly. The receptacle body is rectangular in cross-section and has relatively short sides measured in a widthwise direction and relatively long sides measured in a height direction. The receptacle body includes a latch port extending through at least one of the short sides. A receptacle ferrule is located in the receptacle body. The receptacle ferrule is moveable axially within the receptacle body and biased toward the plug receiving end.

In another embodiment, a plug connector assembly for use in a data center connector system includes a plug body having an insertion end sized to be received within a plug receiving chamber of a receptacle body. The plug body is rectangular in cross-section and has relatively short sides measured in a widthwise direction and relatively long sides measured in a height direction. The receptacle body includes a latch arm extending from at least one of the short sides. A plug ferrule is located within the plug body.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Embodiments disclosed herein generally relate to fiber optic connectors that can be used to connect a plurality of optical fibers (a multi-fiber connector) to other fiber optic connectors. As described herein, the fiber optic connectors may be embodied in a data center connector (DCC) system that can be used as a multiple-fiber push-on/pull-off-style (MPO) connector arrangement; however, other applications for th plug and receptacle connector assemblies are possible. The DCC system includes a receptacle connector assembly that can be panel-mounted to receive a plug connector assembly for connection therewith. As will be described in greater detail below, the plug connector assembly is received by the receptacle connector assembly to reliably join, in a releasable fashion, optical fibers of each of the plug connector assembly and the receptacle connector assembly.

Figure 1:
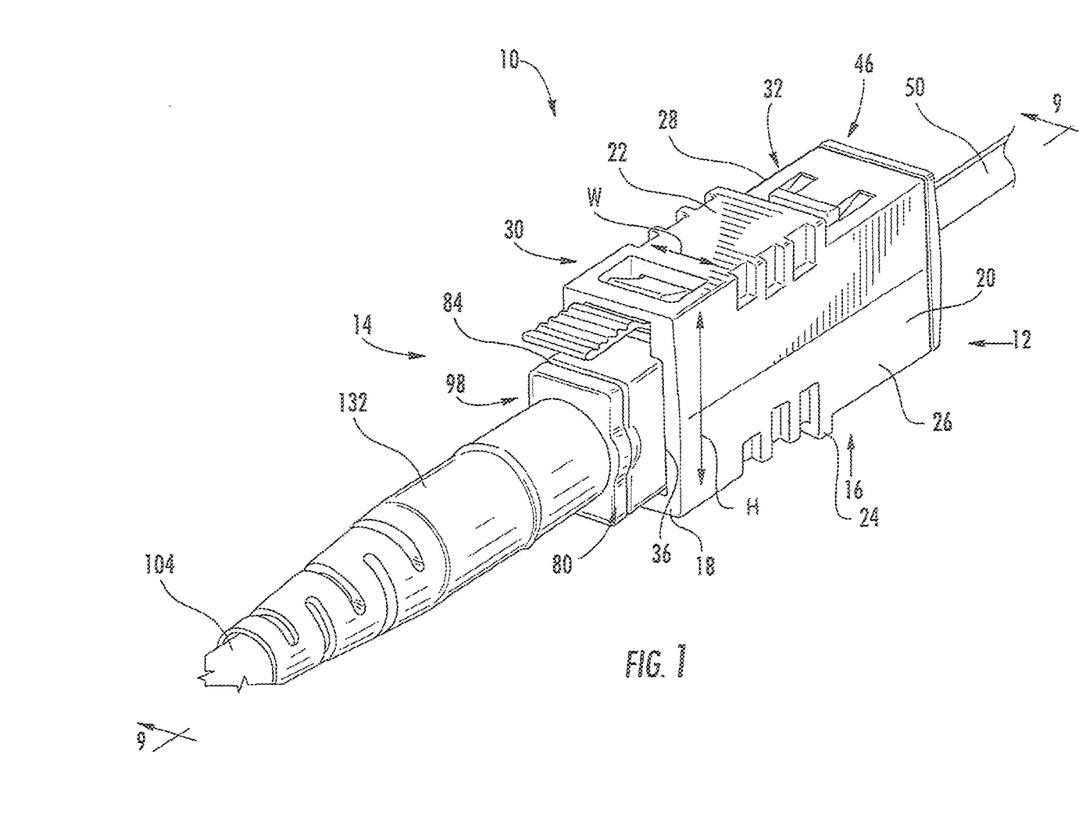
FIG. 1 is a perspective view of an embodiment of a connector with a plug connector assembly mated to a receptacle connector assembly according to one or more embodiments described herein.
Figure 2:
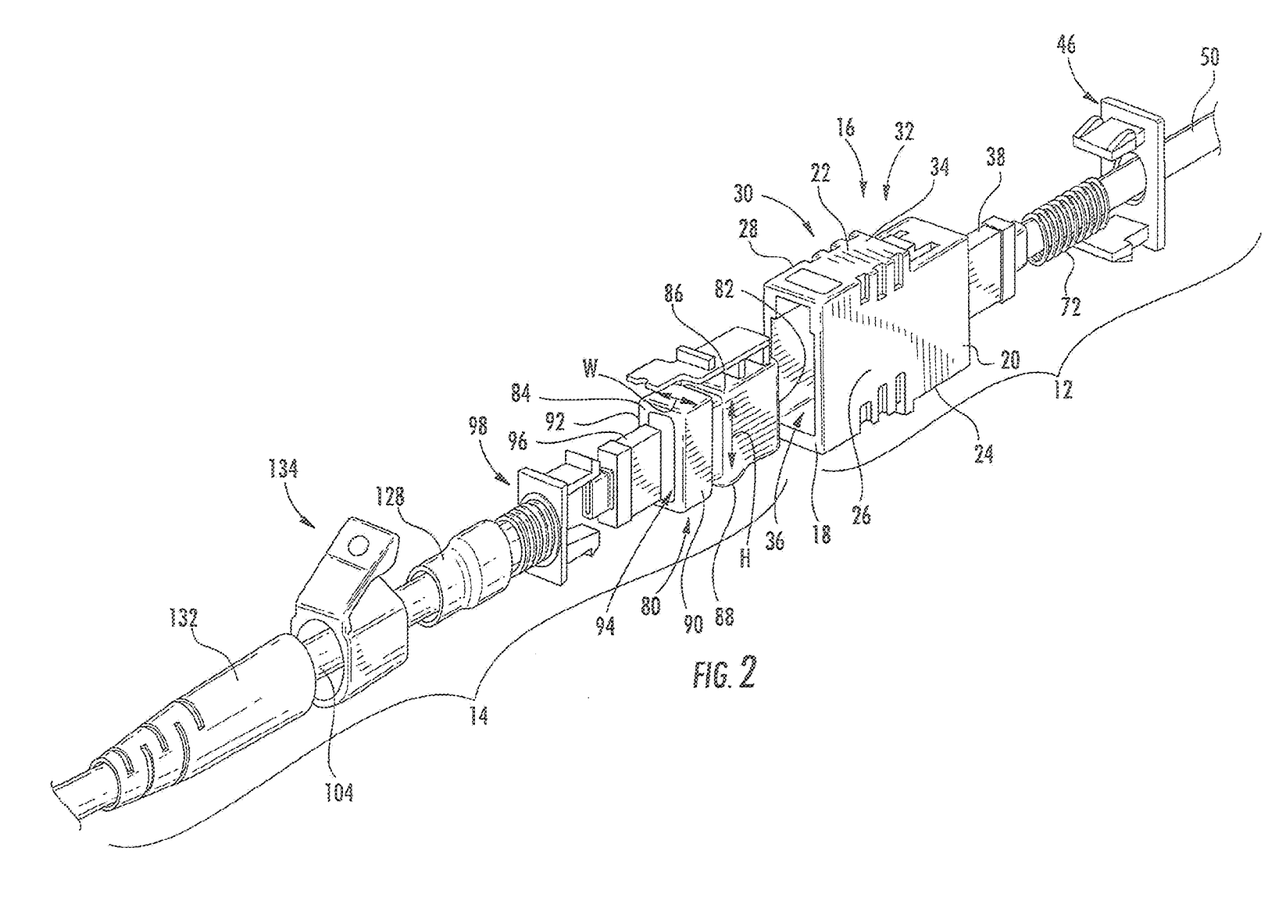
FIG. 2 is an exploded, perspective view of the connector of FIG. 1.

Referring to FIGS. 1 and 2, a DCC system 10 includes a receptacle connector assembly 12 and a plug connector assembly 14. The receptacle connector assembly 12 includes a receptacle body 16 that is generally rectangular in shape having a relatively larger plug receiving portion 30 and a relatively smaller panel insertion portion 32 that is stepped down in height dimension H at a step down location 34 (FIG. 2). The receptacle body 16 further includes a plug-receiving end 18 at the plug receiving portion 30, a panel insertion end 20 at the panel insertion portion 32, relatively short sides 22 and 24 (measured widthwise W) and relatively long sides 26 and 28 (measured along the height H). A chambered bore 36 extends through the receptacle body 16 that is sized to receive the plug connector assembly 14 through the plug receiving end 18 and a receptacle ferrule 38 (e.g., an MT-type ferrule) through the panel insertion end 20 (FIG. 2).

Figure 3:
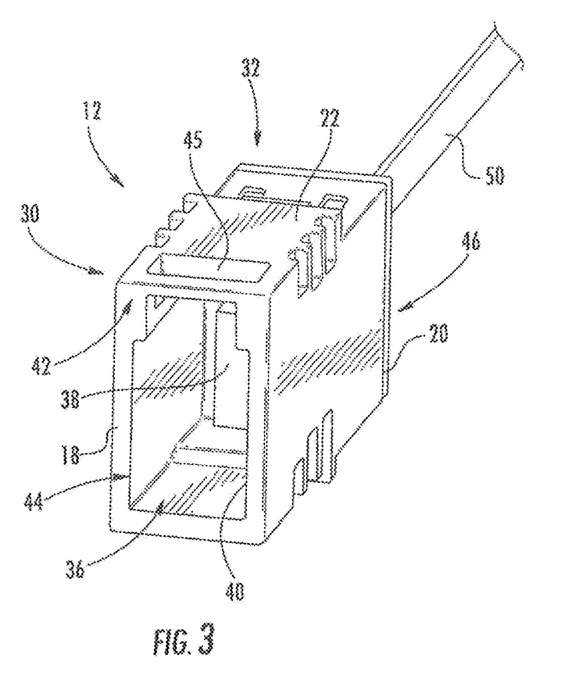
FIG. 3 illustrates an embodiment of a receptacle connector assembly in isolation.
Figure 4:
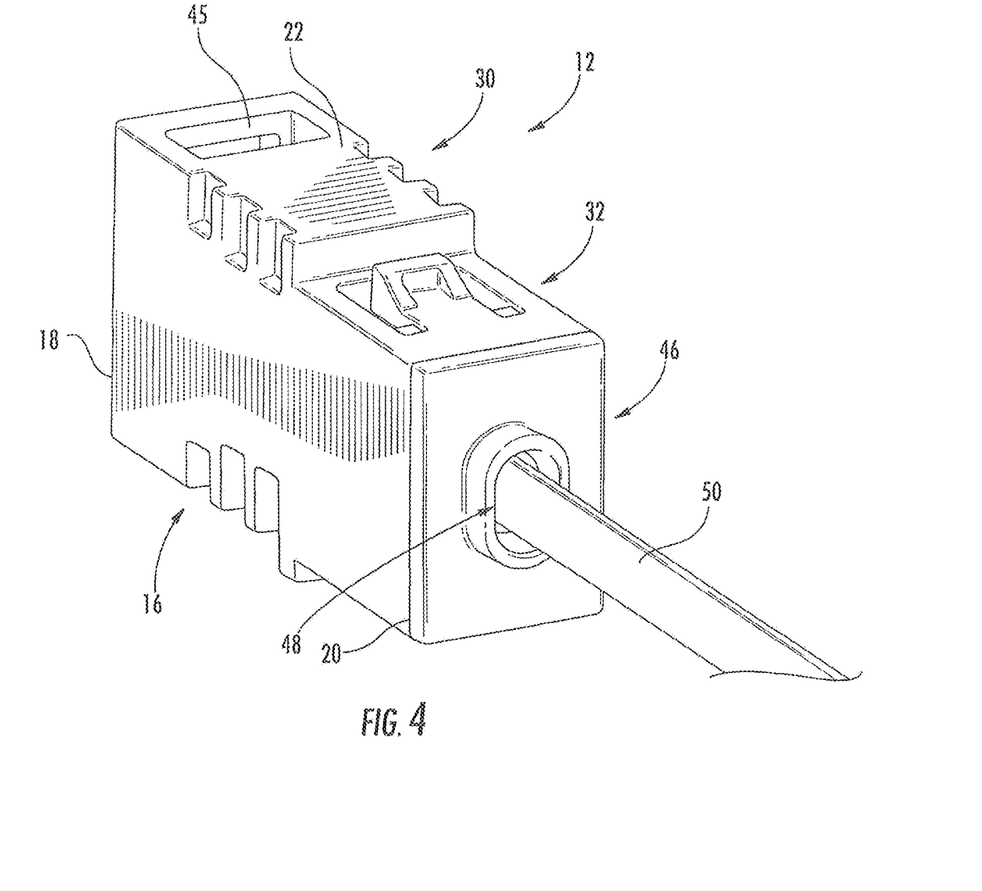
FIG. 4 illustrates a rear view of the receptacle connector assembly of FIG. 3.

Referring to FIGS. 3 and 4, the receptacle connector assembly 12 is illustrated in isolation with FIG. 3 showing the plug receiving portion 30 and plug receiving end 18 and FIG. 4 showing the panel insertion portion 32 and panel insertion end 20. As can be seen by FIG. 3, the chambered bore 36 has a keyed entrance 40 having a narrower portion 42 and a wider portion 44. A lock port 45 extends through the short side 22 of the receptacle body 16 and intersects the chambered bore 36. Referring to FIG. 4, a spring retainer body 46 is received by chambered bore 36 through the panel insertion end 20 of the receptacle body 16. The spring retainer body 46 includes an opening 48 through which a fiber optic ribbon 50 or the like extends and is received within the chambered bore 36.

Figure 5:
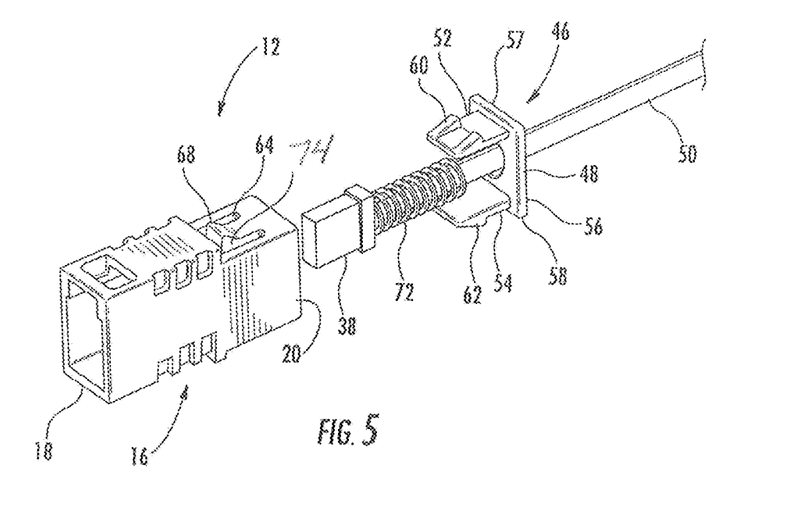
FIG. 5 illustrates an exploded view of the receptacle connector assembly of FIG. 3.
Figure 6:
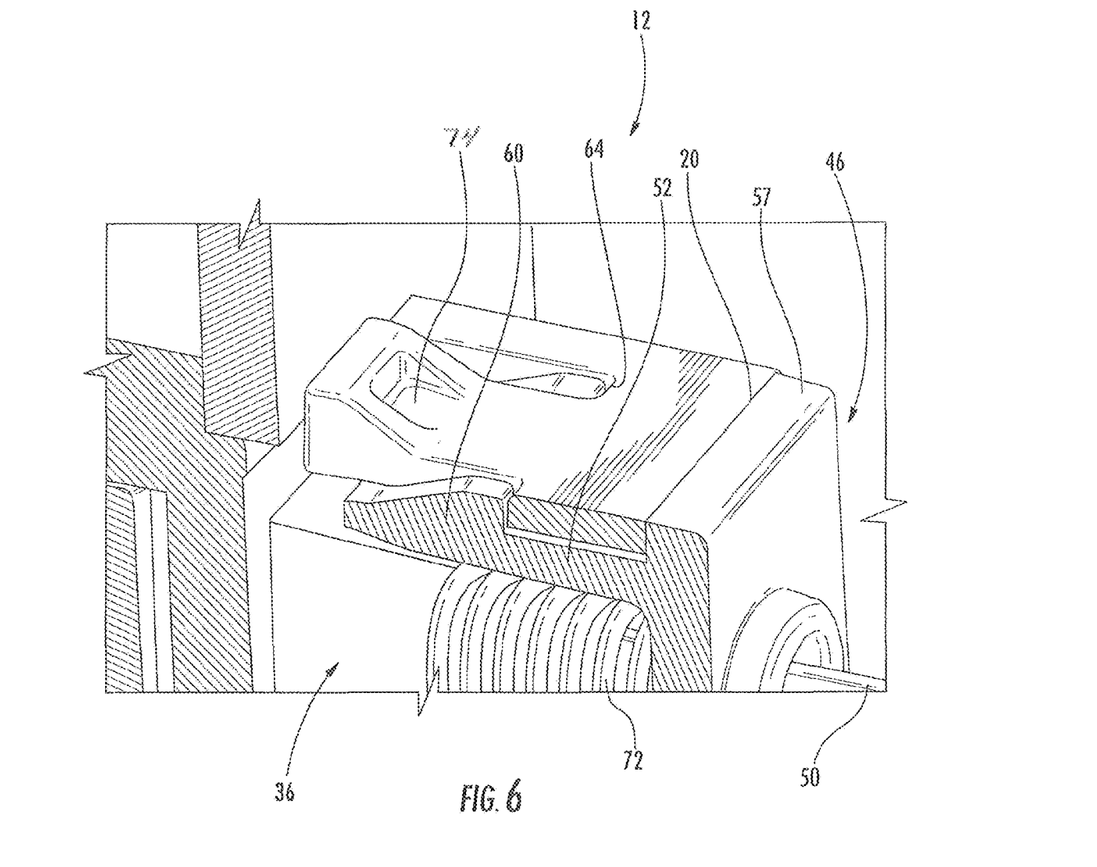
FIG. 6 is a sectional, detail view of the receptacle connector assembly of FIG. 3.

Referring to FIGS. 5 and 6, the spring retainer body 46 includes latch legs 52 and 54 that extend outwardly from a cover portion 56 through which the opening 48 extends. The latch legs 52 and 54 are located at opposite edges 57 and 58 of the cover portion 56 and include latch projections 60 and 62 that engage latch ends 64 and 66 of lock gaps 68 and 70 (only lock gap 68 can be seen in FIGS. 5 and 6). The lock gaps 68 and 70 help define a cantilevered panel latch arm 74 that engages a panel when inserted into. However, the concepts of the receptacle connector assembly may use any suitable structure for engaging securing to a panel such as fasteners like screws, a snap-ring, or the like.

As shown by FIG. 5, the receptacle ferrule 38 is mounted on an end portion of the fiber optic ribbon 50 thereby terminating the fiber optic ribbon 50 and receiving a plurality of ribbonized fibers. While the receptacle ferrule 38 may be any suitable ferrule type, a suitable receptacle ferrule 38 may be an MT-type ferrule having a generally rectangular shape in cross-section. A spring 72 or other suitable biasing member may be provided around the fiber optic ribbon 50 and between the spring retainer body 46 and the receptacle ferrule 38. The spring 72 can provide a biasing force to the receptacle ferrule 38 that biases the receptacle ferrule 38 toward the plug receiving end 18 of the receptacle body 16.

Figure 7:
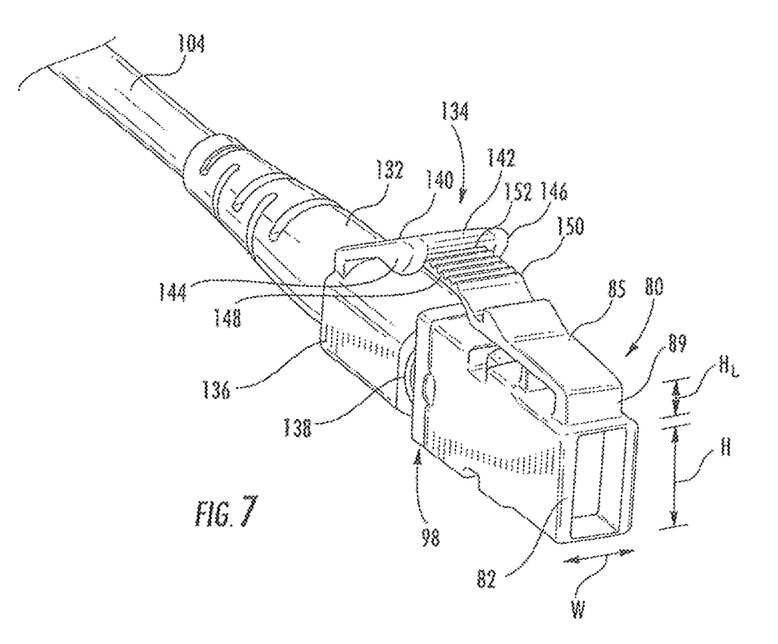
FIG. 7 is a perspective view of an embodiment of a plug connector assembly in isolation.
Figure 8:
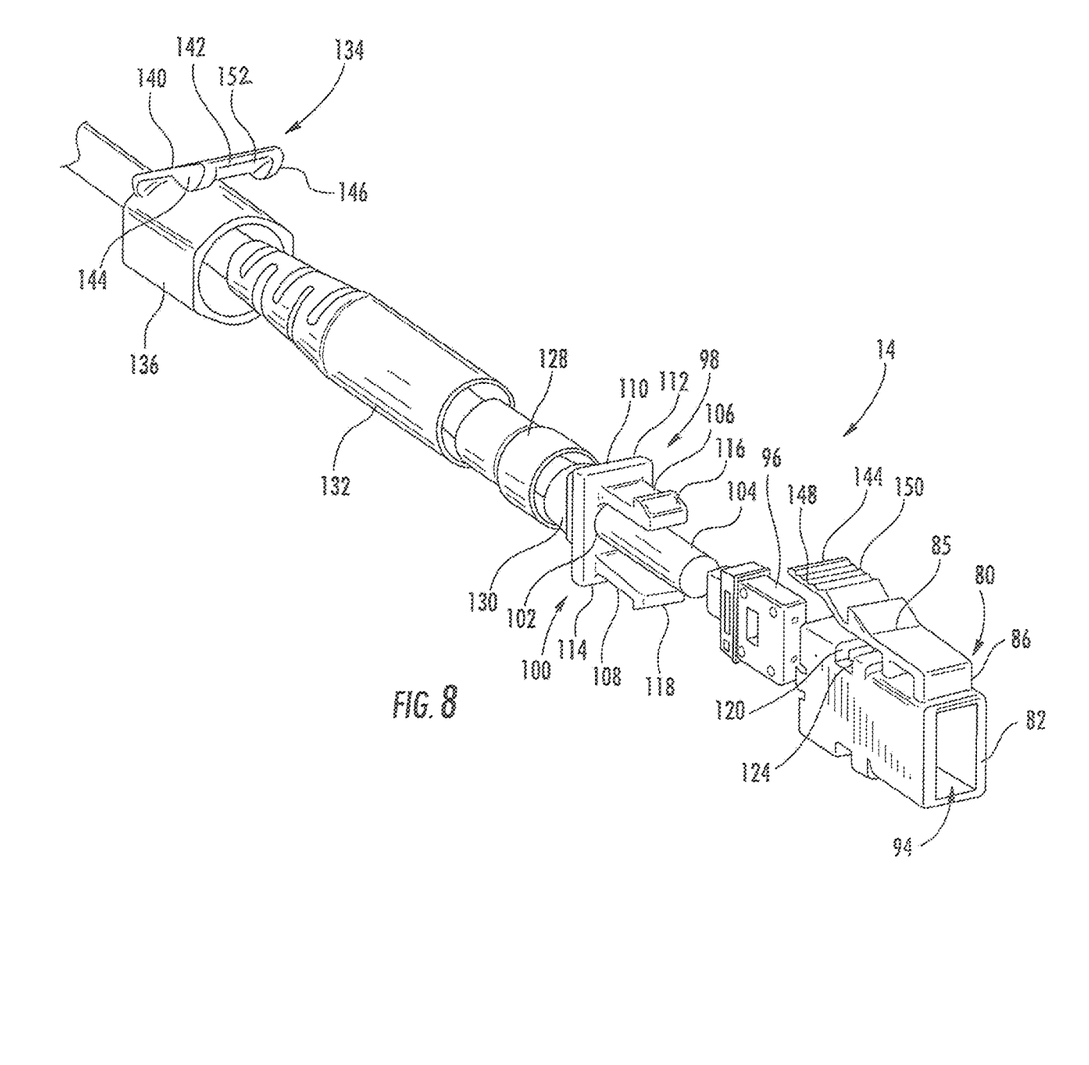
FIG. 8 is an exploded, perspective view of the plug connector assembly of FIG. 7.

Referring back to FIGS. 1 and 2 and also to FIGS. 7 and 8, the plug connector assembly 14 includes a plug body 80 that is generally rectangular in shape having a somewhat constant height dimension H along a length L of the plug body 80. The plug body 80 further includes an insertion end 82, a cable receiving end 84, relatively short sides 86 and 88 (measured widthwise W) and relatively long sides 90 and 92 (measured along the height H). An opening 94 extends through the plug body 80 that is sized to receive a plug ferrule 96 (e.g., an MT-type ferrule) through the cable receiving end 84 (FIG. 8).

Referring particularly to FIGS. 7 and 8 illustrating the plug connector assembly 14 in isolation, the plug body 80 has a width W and a height H at the insertion end 82 that is sized to be received through the keyed entrance 40 and into the chambered bore 36 of the receptacle body 16. In particular, the plug body 80 is sized and shaped to be received through the wider portion 44 of the keyed entrance 40. A latch arm 85 extends outwardly from the plug body 80 and is connected therewith (i.e., integrally formed) and extends generally lengthwise along a length of the plug body 80. While only one latch arm is shown, there may be multiple latch arms, for example on each short side 86 and 88 of the plug body 80. A height $H_L$ of the latch arm 85 at forward portion 89 is sized to be received within the narrower portion 42 of the keyed entrance 40. For embodiments with multiple latch arms, there may be multiple narrower portions or other suitable geometries to provide a keyed entry arrangement. As will be described below, the latch arm 85 latches into the lock port 45 of the receptacle body 16 (FIG. 3).

The plug connector assembly 14 includes the plug ferrule 96 (FIG. 8) that is received within the plug body 80 through the cable receiving end 84. While the plug ferrule 96 may be any suitable ferrule type, a suitable plug ferrule 96 may be an MT-type ferrule having a generally rectangular shape in cross-section. Referring to FIG. 8, a plug ferrule retainer 98 connects to the cable receiving end 84 of the plug body 80. The plug ferrule retainer 98 includes a ferrule retainer body 100 that includes an opening 102 through which a fiber optic cable 104 extends and is received within the rear portion of opening 94. The ferrule retainer body 100 includes latch legs 106 and 108 that extend outwardly from a cover portion 110 through which the opening 102 extends. The latch legs 106 and 108 are located at opposite edges 112 and 114 of the cover portion 110 and include latch projections 116 and 118 that engage latch ends 120 and 122 of lock gaps 124 and 126 (only lock gap 124 can be seen in FIGS. 7 and 8).

A crimp band 128 is received about the fiber optic cable 104. The crimp band 128 may be crimped about a cable receiving portion 130 of the plug ferrule retainer 98 and the fiber optic cable 104 to prevent movement of the fiber optic cable 104 and the plug ferrule 96 relative to the plug ferrule retainer 98 once the plug ferrule retainer 98 is secured to the plug body 80. In this way, the plug ferrule 96 may be held in a fixed position within the plug body 80 and is not spring biased like the receptacle ferrule 38 in the receptacle body 16.

Referring again to FIGS. 7 and 8, a strain relief boot 132 may be provided about the fiber optic cable 104 and at least partially about one or more of the crimp band 128 and the plug ferrule retainer 98 if desired. The strain relief boot 132 can provide enhanced strain relief and connector protection and may provide an optional cable termination sleeve that protects the bend radius of the fiber optic cable 104 and limit bending strain on the optical fiber. An optional trigger device 134 may include a cable receiving body 136 having a bore 138 (FIG. 8) that slidably receives the fiber optic cable 104 and the strain relief boot 132. The trigger device 134 includes a trigger arm 140 that extends outwardly from the cable receiving body 136 to a latch end 142. The latch end 142 interlocks with a latch end 144 of the latch arm 85. The latch end 142 of the trigger arm 140 includes side barrier projections 144 and 146 that extend along sides 148 and 150 of the latch arm 85 thereby providing a notch 152 that receives the latch end 144 of the latch arm 85.

Figure 9:
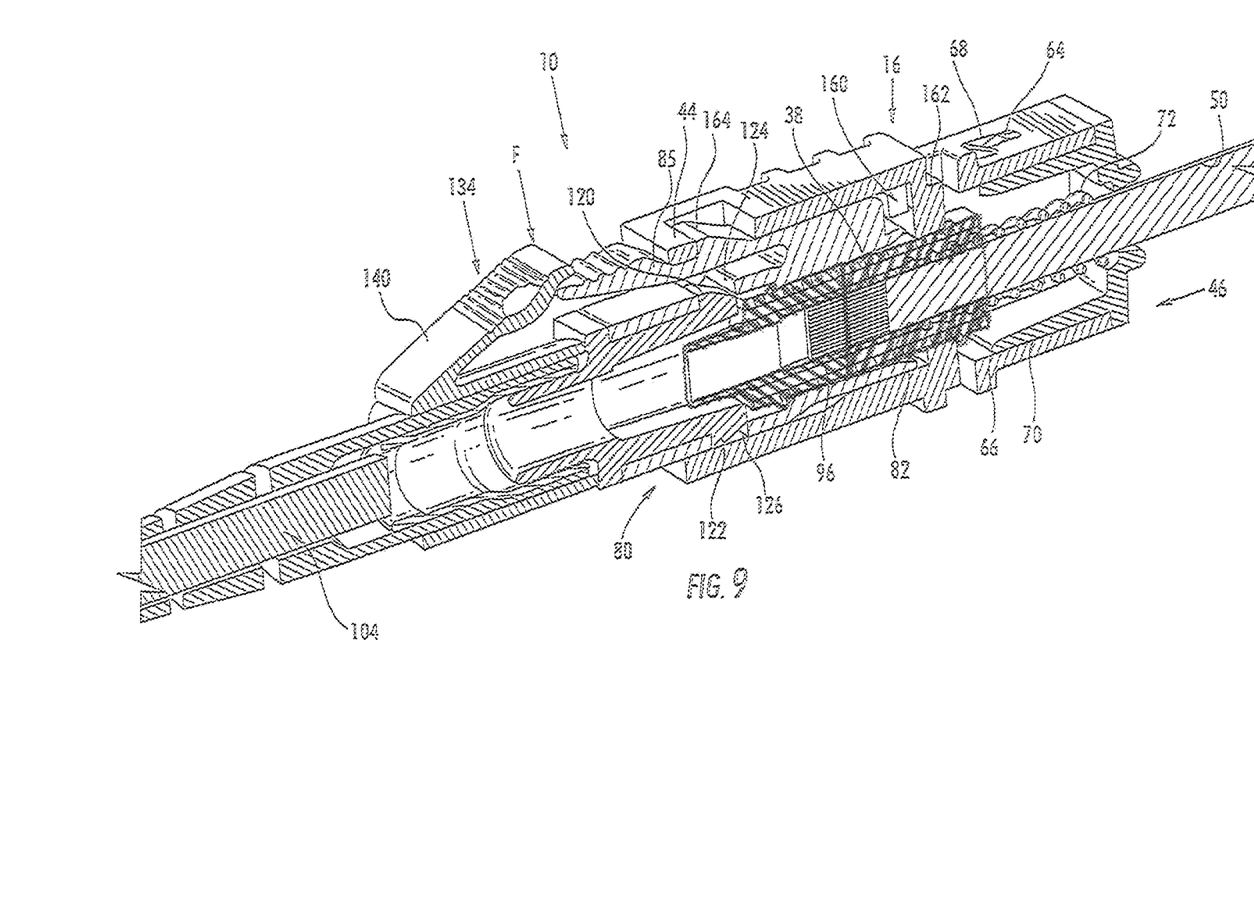
FIG. 9 is a section view along lines 9-9 of FIG. 1.

Referring to FIG. 9, a section view of the DCC system 10 is shown in a connected configuration with the plug connector assembly 14 engaged with the receptacle connector assembly 12. A portion of the fiber optic cable 104 is removed for clarity. As can be seen, the plug body 80 of the plug connector assembly 14 is received within a plug receiving chamber 160 within the receptacle body 16. The insertion end 82 slides into the plug receiving chamber 160 thereby bringing the plug ferrule 96 into contact with the receptacle ferrule 38. Once contact is made between the plug ferrule 96, which is fixed within the plug body 80, and the receptacle ferrule 38, the receptacle ferrule 38 can translate axially within the receptacle body 16, while the spring 72 biases the receptacle ferrule 38 against the plug ferrule 96. A chamber wall 162 can provide a stop that limits the insertion distance of the plug body into the plug receiving chamber 160, yet allowing for contact between the plug ferrule 96 and the receptacle ferrule 38. An engagement latch 164 of the latch arm 85 may extend into the lock port 45 of the receptacle body 16. The latch arm 85 may be formed of a resilient material that biases the engagement latch 164 toward the lock port 45. A release force F perpendicular to the axial direction of the connected DCC system 10 may be used to release the engagement latch 164 from the lock port 45. This can allow the plug body 80 to be removed from the plug receiving chamber 160. The trigger arm 140 of the trigger device 134 may be used to facilitate application of the release force F by providing an increased surface area for application of the release force F.

Figure 10:
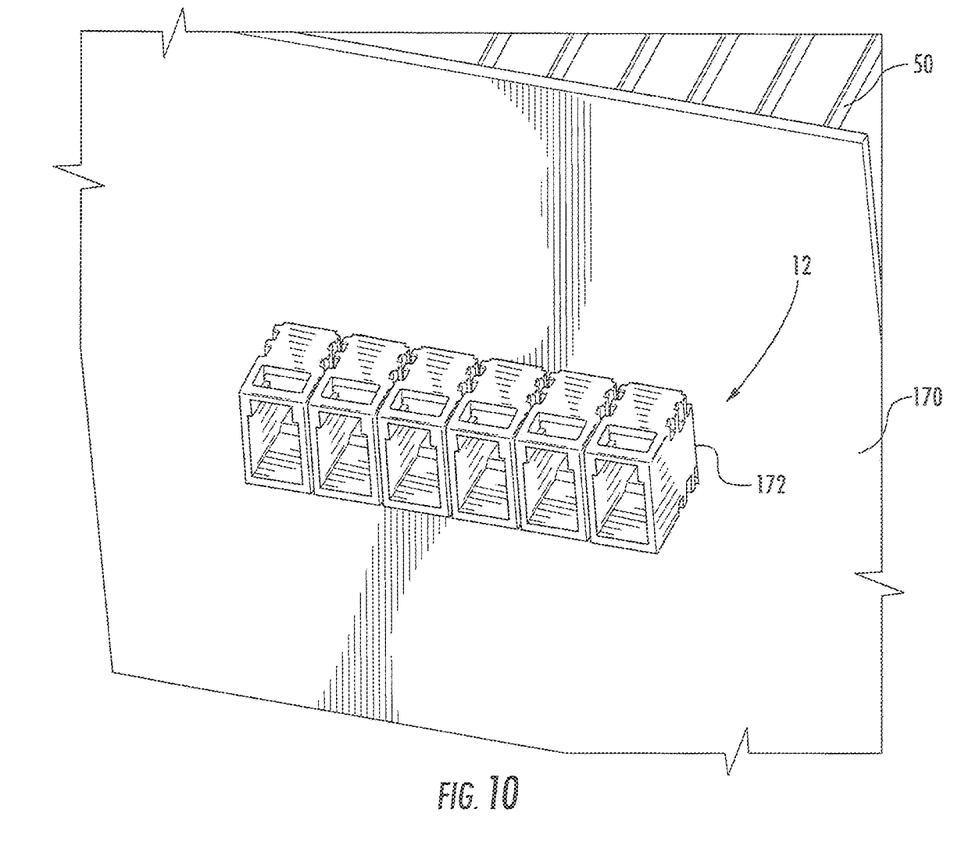
FIG. 10 illustrates an array of the receptacle connector assemblies of FIG. 3 connected to a panel.
Figure 11:
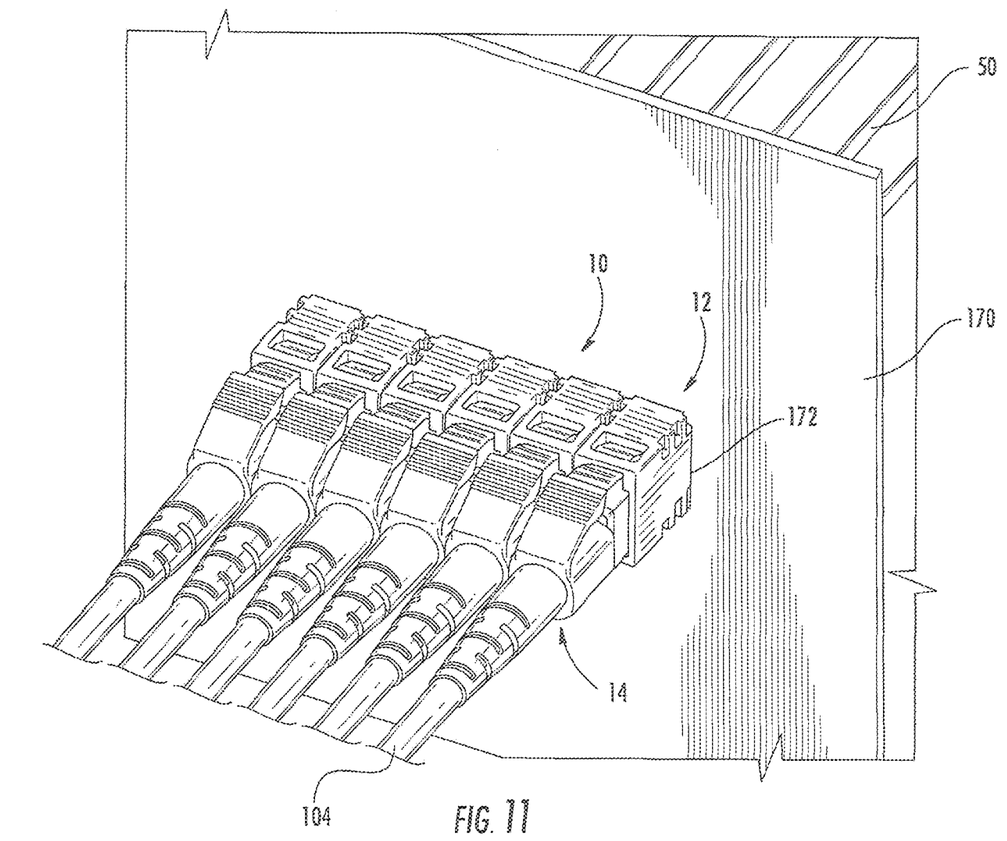
FIG. 11 illustrates an array of the plug connector assemblies of FIG. 7 mated with the receptacle connector assemblies of FIG. 10.

Referring now to FIG. 10, in some embodiments, the receptacle connector assembly 12 may be part of an array of receptacle connector assemblies 12 connected to a panel 170, each receptacle connector assembly 12 having a bare or lightly jacketed fiber optic ribbon 50 extending to internal switching circuitry. The receptacle connector assemblies 12 may have their panel insertion portions 32 inserted into openings 172 in the panel 170. The cantilevered panel latch arms 74 (FIG. 6) may be used to secure the receptacle connector assemblies 12 on the panel 170. FIG. 11 illustrates the plug connector assemblies 14 engaged with the receptacle connector assemblies 12, as described above with FIG. 9.

The above-described DCC systems provide a plug connector assembly that can be releasably mated with a receptacle connector assembly to interconnect optical fibers in a reliable manner which minimizes attenuation of the optical signals and allows for moves, adds and/or changes to the system. Further, the plug connector assembly mates with the receptacle connector assembly without any need for an adapter. While the fiber optic ribbon 50 may be bare or lightly jacketed, in other embodiments, a fiber optic cable may be used that has a ribbon or loose optical fibers.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A data center connector (DCC) system, comprising:
a receptacle connector assembly comprising:
a receptacle body having a plug receiving end, a panel insertion end and a plug receiving chamber at the plug receiving end that receives a plug body of a plug connector assembly, the receptacle body having a plug receiving portion including the plug receiving end and a panel insertion portion including the panel insertion end, wherein the panel insertion portion being stepped down in height from the plug receiving portion at a step down location between the plug receiving end and the panel insertion end providing a stop; and
a receptacle ferrule located in the receptacle body, the receptacle ferrule being moveable axially within the receptacle body and biased toward the plug receiving end; and
a plug connector assembly comprising:
a plug body having an insertion end sized to be received within the plug receiving chamber of the receptacle body; and
a plug ferrule fixed axially within the plug body with the plug connector assembly disconnected with the receptacle connector assembly, the plug ferrule contacts the receptacle ferrule and moves the receptacle ferrule axially with the plug body inserted within the plug receiving chamber of the receptacle body;
wherein the receptacle ferrule enters the plug body and contacts the plug ferrule with the plug body received within the plug receiving chamber.

2. The DCC system of claim 1, wherein the receptacle body is rectangular in cross section having relatively short sides measured in a widthwise direction and relatively long sides measured in a height direction.

3. The DCC system of claim 2, wherein the plug connector assembly comprises a latch arm that extends outwardly from the plug body that is configured to engage a latch structure at one of the short sides of the receptacle body.

4. The DCC system of claim 1, wherein the receptacle connector assembly further comprises a spring retainer that is connected to the receptacle body at the panel insertion end.

5. The DCC system of claim 4, wherein the receptacle connector assembly further comprises a spring located between the spring retainer and the receptacle ferrule.

6. The DCC system of claim 4, wherein the spring retainer comprises a spring retainer body comprises a cover portion through which an opening extends, a first latch leg extending outwardly from the cover portion and a second latch leg extending outwardly from the covering portion, the first and second latch legs each including latch projections that engage the receptacle body.

7. The DCC system of claim 6, wherein the receptacle connector assembly further comprises a fiber optic ribbon extending through the opening through the covering portion and connected to the receptacle ferrule.

8. The DCC system of claim 1, wherein the receptacle body has a keyed entrance at the plug receiving end having a wider portion and a narrower portion.

9. The DCC system of claim 1, wherein the plug connector assembly comprises a plug ferrule retainer connected to a cable receiving end of the plug body.

10. The DCC system of claim 9, wherein the plug connector assembly comprises a fiber optic cable that extends through the plug ferrule retainer and is connected to the plug ferrule.

11. The DCC system of claim 10, wherein the plug ferrule retainer is fixed to the fiber optic cable.

12. The DCC system of claim 11, wherein the plug connector assembly comprises a crimp band that fixes the ferrule retainer to the fiber optic cable.

13. A receptacle connector assembly of a data center connector system, comprising:
a receptacle body having a plug receiving end, a panel insertion end and a plug receiving chamber at the plug receiving end that receives a plug body of a plug connector assembly, the receptacle body being rectangular in cross section and having relatively short sides measured in a widthwise direction and relatively long sides measured in a height direction, the receptacle body including a latch port extending through at least one of the short sides, wherein the receptacle body having a plug receiving portion including the plug receiving end and a panel insertion portion integral with the plug receiving portion including the panel insertion end, wherein the panel insertion portion being stepped down in height from the plug receiving portion at a step down location between the plug receiving end and the panel insertion end providing a stop;

a receptacle ferrule located in the receptacle body, the receptacle ferrule being moveable axially within the receptacle body and biased toward the plug receiving end; and a spring retainer that is connected to the receptacle body at the panel insertion end, the spring retainer comprising a spring retainer body comprising a cover portion through which an opening extends, a first latch leg extending outwardly from the cover portion and a second latch leg extending outwardly from the covering portion, the first and second latch legs each including latch projections that engage the receptacle body;

wherein the first and second latch legs terminate within the panel insertion end outside the plug receiving chamber.

14. The receptacle connector assembly of claim 13 further comprising a spring located between the spring retainer and the receptacle ferrule.

15. The receptacle connector assembly of claim 13 further comprising a fiber optic ribbon extending through the opening through the cover portion and connected to the receptacle ferrule.

16. The receptacle connector assembly of claim 13, wherein the receptacle body has a keyed entrance at the plug receiving end having a wider portion and a narrower portion.

17. The DCC of claim 1, wherein the receptacle body includes only a single plug receiving chamber.

18. The DCC system of claim 6, wherein the receptacle body includes a cantilevered latch arm defined by a lock gap formed in the panel insertion end of the receptacle body that extends alongside the cantilevered latch arm, the lock gap being sized and arranged to receive the latch projections of at least one of the first and second latch legs for engaging the receptacle body.

* * * * *